United States Patent
Zhang et al.

(10) Patent No.: US 11,991,748 B2
(45) Date of Patent: May 21, 2024

(54) METHODS AND SYSTEM FOR LBT THRESHOLD SETTING FOR DIRECTIONAL RECEPTION AND TRANSMISSION

(71) Applicant: Huawei Technologies Co., Ltd., Shenzhen (CN)

(72) Inventors: Jiayin Zhang, Kanata (CA); Lei Huang, Shanghai (CN); Yingpei Lin, Shanghai (CN); Yan Xin, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 158 days.

(21) Appl. No.: 17/565,100

(22) Filed: Dec. 29, 2021

(65) Prior Publication Data
US 2022/0124810 A1    Apr. 21, 2022

Related U.S. Application Data

(63) Continuation of application No. 15/882,439, filed on Jan. 29, 2018, now Pat. No. 11,277,865.
(Continued)

(51) Int. Cl.
*H04W 74/08* (2009.01)
*H04B 7/08* (2006.01)
(Continued)

(52) U.S. Cl.
CPC .......... *H04W 74/0816* (2013.01); *H04B 7/08* (2013.01); *H04W 16/14* (2013.01); *H04B 7/086* (2013.01); *H04W 16/28* (2013.01)

(58) Field of Classification Search
None
See application file for complete search history.

(56) References Cited

U.S. PATENT DOCUMENTS

| 10,069,575 B1 | 9/2018 | Garcia Rodriguez et al. |
| 2012/0225687 A1 | 9/2012 | Norair |

(Continued)

FOREIGN PATENT DOCUMENTS

| CN | 105577291 A | 5/2016 |
| CN | 106161292 A | 11/2016 |

(Continued)

OTHER PUBLICATIONS

Maltsev, V. et al., "Channel Models for 60 GHz WLAN Systems," IEEE P802.11 Wireless LANs, doc.: IEEE 802.11-09/0334r8, May 20, 2010, 152 pages.

(Continued)

*Primary Examiner* — Marcus Smith
(74) *Attorney, Agent, or Firm* — Slater Matsil, LLP

(57) ABSTRACT

A method and system for LBT or CCA threshold setting for directional reception and transmission are provided. In an embodiment, a method in a wireless device for determining if a channel is clear in an unlicensed band channel in a wireless network includes detecting, with the wireless device, an energy along a first beamforming direction. The method also includes determining, with the wireless device, an energy detection threshold. The method also includes determining, with the wireless device, whether the unlicensed band channel is clear in at least the first receiving direction according to the energy and the energy detection threshold.

15 Claims, 12 Drawing Sheets

Related U.S. Application Data

(60) Provisional application No. 62/512,547, filed on May 30, 2017.

(51) Int. Cl.
*H04W 16/14* (2009.01)
*H04W 16/28* (2009.01)
*H04W 74/0816* (2024.01)

(56) References Cited

U.S. PATENT DOCUMENTS

| | | |
|---|---|---|
| 2013/0182683 A1 | 7/2013 | Seol et al. |
| 2015/0373652 A1 | 12/2015 | Dabeer et al. |
| 2016/0037560 A1 | 2/2016 | Liu et al. |
| 2016/0050674 A1 | 2/2016 | Kenney et al. |
| 2016/0173361 A1* | 6/2016 | Somasundaram ... H04B 17/318 370/328 |
| 2017/0118771 A1 | 4/2017 | Kazmi et al. |
| 2017/0118774 A1 | 4/2017 | Cariou et al. |
| 2017/0208624 A1 | 7/2017 | Zhang et al. |
| 2017/0303136 A1 | 10/2017 | Park et al. |
| 2017/0331714 A1 | 11/2017 | Yang et al. |
| 2017/0332243 A1 | 11/2017 | Macmullan et al. |
| 2018/0220461 A1 | 8/2018 | Shi et al. |
| 2018/0235006 A1 | 8/2018 | Li et al. |
| 2018/0255582 A1 | 9/2018 | Kecicioglu |
| 2018/0279365 A1 | 9/2018 | Wang et al. |
| 2018/0288804 A1* | 10/2018 | Cheng .................. H04W 16/14 |
| 2018/0376339 A1 | 12/2018 | Hu et al. |
| 2019/0166563 A1 | 5/2019 | Ansai et al. |

FOREIGN PATENT DOCUMENTS

| | | |
|---|---|---|
| CN | 2017024659 A1 | 2/2017 |
| CN | 106658751 A | 5/2017 |
| CN | 106664723 A | 5/2017 |
| WO | 2016064169 A2 | 4/2016 |
| WO | 2017024520 A1 | 2/2017 |
| WO | 2017061934 A1 | 4/2017 |
| WO | 2017074642 A1 | 5/2017 |

OTHER PUBLICATIONS

Samsung, "ED threshold adaptation for LAA", 3GPP TSG RAN WG1 Meeting #83, R1-156762, Nov. 15-22, 2015, 3 Pages, Anaheim, USA.

* cited by examiner

METHODS AND SYSTEM FOR LBT THRESHOLD SETTING FOR DIRECTIONAL RECEPTION AND TRANSMISSION

This application is a continuation of U.S. patent application Ser. No. 15/882,439, filed on Jan. 29, 2018, now U.S. Pat. No. 11,277,865 issued on Mar. 15, 2023, which claims the benefit of U.S. Provisional Application No. 62/512,547, filed on May 30, 2017, both of which are hereby incorporated herein by reference.

TECHNICAL FIELD

The present disclosure relates generally to a system and method for wireless communication using unlicensed bands, and, in particular embodiments, to a system and method for determining whether a channel is clear in an unlicensed band.

BACKGROUND

Both Long Term Evolution (LTE) Licensed Assisted Access (LAA) and WiFi 802.11 use Carrier Sensing Multiple Access/Collision Avoidance (CSMA/CA) when attempting to access an unlicensed band channel. CSMA/CA includes two components: Clear Channel Assessment (CCA)/Listen-Before-Talk (LBT) and random backoff.

In Institute of Electrical and Electronics Engineers (IEEE) 802.11 systems, a fixed Energy Detection/Packet Detection (ED/PD) threshold has been adopted. In 802.11ad, a −68 decibel-milliwatts (dBm) threshold for packet detection (PD) has been adopted for both Directional Multi-Gigabit (DMG) Ctrl PHY and regular DMG Physical layer convergence procedure Protocol Data Unit (PPDU), and a −48 dBm threshold has been adopted for ED. dBm is an abbreviation for the power ratio in decibels (dB) of the measured power referenced to one milliwatt (mW). A power level of 0 dBm corresponds to a power of 1 milliwatt. Quasi-omni directional antennas are used to measure the channel. Other WiFi systems working in different bands adopt similar schemes, though not necessarily using the same threshold levels.

In European Telecommunications Standards Institute (ETSI) European Standard (EN) 302 567, the CCA threshold is related to the maximum transmit power, i.e., the energy detection threshold for the CCA shall be −47 dBm+(40 dBm−$P_{out}$ (dBm)) assuming a 0 dBi antenna gain. The expression dBi is used to define the gain of an antenna system relative to an isotropic radiator at radio frequencies. dBi is an abbreviation for "decibels relative to isotropic." The LTE LAA/Enhanced LAA (eLAA) has adopted similar schemes, but with different values. IEEE 802.11ax also introduces a similar scheme as an additional feature to improve spatial reuse.

All of the above schemes assume quasi-omni directional antennas. However, directional antennas are increasingly utilized to improve performance in wireless systems. For example, in high frequency (HF) (e.g., 60 GHz), directional antennas are widely used to enhance the coverage at both the transmitter and the receiver. Because directional antennas are widely used, it is possible that a channel in one direction is available while the same channel in a different direction is unavailable. However, current clear channel assessment methods are unable to determine whether a channel in a particular direction is available even when the same channel in a different direction is unavailable. Therefore, many of the advantages of using directional antennas are not realizable with the current schemes.

SUMMARY

In accordance with an embodiment of the present disclosure, a method in a wireless device for determining if a channel is clear in an unlicensed band channel in a wireless network is provided. The method includes detecting, with the wireless device, an energy along a first beamforming direction. The method also includes determining, with the wireless device, an energy detection threshold. The method also includes determining, with the wireless device, whether the unlicensed band channel is clear in at least the first receiving direction according to the energy and the energy detection threshold.

In accordance with another embodiment of the present disclosure, a wireless device configured to determine if a channel is clear in an unlicensed band channel in a wireless network is provided. The wireless device includes one or more antennas, a detector, a threshold determiner, and a channel state determiner. The detector is coupled to the one or more antennas. The detector is operable to detect an energy along a first beamforming direction. The threshold determiner is operable to determine an energy detection threshold. The channel state determiner is operable to determine whether the unlicensed band channel is clear in at least the first receiving direction according to the energy and the energy detection threshold.

In accordance with another embodiment of the present disclosure, a wireless device for determining if a channel is clear in an unlicensed band channel in a wireless network is provided. The wireless device includes a non-transitory memory storage comprising instructions and one or more processors in communication with the non-transitory memory storage. The one or more processors execute the instructions. The instructions include detecting an energy along a first beamforming direction. The instructions also include determining an energy detection threshold. The instructions also include determining whether the unlicensed band channel is clear in at least the first receiving direction according to the energy and the energy detection threshold.

In accordance with another embodiment, a method in a wireless device for determining if a channel is clear in an unlicensed band channel in a wireless network includes detecting, with the wireless device, an energy along a first receiving direction. The method also includes determining, with the wireless device, an energy detection threshold according to an effective EIRP. The effective EIRP is determined according to at least one of a mean equivalent isotropically radiated power (EIRP) and a maximum EIRP. The method also includes determining, with the wireless device, whether the unlicensed band channel is clear in at least the first receiving direction according to a comparison of the energy detected along the first receiving direction with the energy detection threshold. The EIRP is the product of at least one of a transmit power of the wireless device, one or multiple antenna gains of one or multiple beamforming vectors in a linear domain.

In one or more of the preceding embodiments, the energy detection threshold is determined according to at least one a transmit power of the wireless device or a transmit antenna gain of the wireless device.

In one or more of the preceding embodiments, the antenna gain includes an element gain and an array gain.

In one or more of the preceding embodiments, an effective antenna gain is determined according to a mean antenna gain and/or a maximum antenna gain.

In one or more of the preceding embodiments, the energy detection threshold is determined according to a mean or a maximum of antenna gains or a mean or a maximum of EIRPs of a transmission following a first time interval.

In one or more of the preceding embodiments, the first time interval is at least one listen before talk (LBT) time interval or at least one clear channel assessment (CCA) time interval.

In one or more of the preceding embodiments, the energy detection threshold is determined according to a mean or a maximum of antenna gains or mean or maximum EIRPs of the wireless device.

In one or more of the preceding embodiments, the energy is normalized according to the antenna gain of one or more receiving antennas.

In one or more of the preceding embodiments, the detecting the energy includes beam sweeping over one or more time slots to detect a plurality of energies corresponding to a plurality of receiving directions, wherein each of the one or more time slots corresponds to a different receiving direction.

In one or more of the preceding embodiments, the detecting the energy includes detecting a plurality of energies over a plurality of beamforming directions, wherein detection of energies in different receiving directions are interlaced in a frequency domain.

In one or more of the preceding embodiments, wherein the detecting the energy comprises detecting a plurality of energies corresponding to a plurality of receiving directions in parallel.

In one or more of the preceding embodiments, the mean EIRP of a transmission burst is determined according to:

$$\text{mean}_{burst}(EIRP) = 10\log\left(\Sigma_i \frac{k_i n_i}{N} \Sigma_s \hat{P}_{s,i} \hat{G}_{s,i}\right),$$

where $k_i$ is the size of the time resource and $n_i$ is the size of the frequency resource assigned in the allocation i in terms of resource unit, N is the duration of the transmission burst before carrying on additional Listen-Before-Talk (LBT) within a channel occupancy time (COT), $\hat{P}_{s,i}$ is a transmit power on a per time or frequency unit of spatial layer s in a linear domain, and $\hat{G}_{s,i}$ is the antenna gain of the beamforming vector of the spatial layer s of the allocation i in the linear domain.

In one or more of the preceding embodiments, the mean EIRP of an initiating device is determined according to:

$$\text{mean}_{device}(EIRP) = \text{mean}_{i,j}(10 \log(P_i \hat{G}_j)),$$

where $P_{max}$ is the maximum allowed transmit power of the initiating device in a linear domain, and $\hat{G}_j$ is the antenna gain of usable beamforming vector of the initiating device in the linear domain.

In one or more of the preceding embodiments, the maximum EIRP of a transmission burst is determined according to:

$$\text{max}_{burst}(EIRP) = \text{max}_{k=0,\ldots,K-1}(10 \log(\Sigma_i n_{i,k} \Sigma_{s,k} \hat{P}_{s,i,k} \hat{G}_{s,i,k})),$$

where $k_i$ is the size of the time resource and $n_i$ is the size of the frequency resource assigned in the allocation i in terms of resource unit, N is the duration of the transmission burst before carrying on additional Listen-Before-Talk (LBT) within a channel occupancy time (COT), $\hat{P}_{s,i}$ is a transmit power on a per time or frequency unit of spatial layer s in a linear domain, and $\hat{G}_{s,i}$ is the antenna gain of the beamforming vector of the spatial layer s of the allocation i in the linear domain.

In one or more of the preceding embodiments, the maximum EIRP of an initiating device is determined according to:

$$\text{max}_{device}(EIRP) = \text{max}_{j=0,\ldots,J-1}(10 \log(P_{max} \hat{G}_j)),$$

where $P_{max}$ is the maximum allowed transmit power of the initiating device in a linear domain, and $\hat{G}_j$ is the antenna gain of usable beamforming vector of the initiating device in the linear domain.

In one or more of the preceding embodiments, the method includes initiating a burst following a successful Listen-Before-Talk (LBT), wherein the energy detection threshold is set according to a mean EIRP or maximum EIRP of the burst.

In one or more of the preceding embodiments, a wireless device extends a current continuous transmission burst without additional LBT when the mean or maximum EIRP including an allocation in the extension does not exceed the mean EIRP or the maximum EIRP when the transmitter is used to contend for the channel.

In one or more of the preceding embodiments, a wireless device performs another LBT before continuing transmitting an extension part when the mean EIRP or the maximum EIRP including the allocation in the extension exceeds the mean or maximum EIRP when the transmitter is used to contend for the channel.

In one or more of the preceding embodiments, the mean EIRP comprises a weighted average of multiple EIRPs corresponding to each resource allocation in a following burst, wherein a weighting factor of each EIRP is related to a portion of resources in the burst in at least one of a time domain, a frequency domain, and a spatial domain.

In one or more of the preceding embodiments, the mean EIRP of a device is an average of a plurality of allowed EIRPs of an initiating device.

In one or more of the preceding embodiments, the maximum EIRP comprises a maximum of multiple EIRPs of each resource allocation in a following burst. When there are multiple resource allocation multiplexed in frequency domain at same time unit, the EIRP of the resource allocation multiplexed in frequency domain at the same time unit should be summed in linear domain. Then, the maximum is carried out among the multiple EIRP corresponding to each time unit.

In one or more of the preceding embodiments, the maximum EIRP of a device is a maximum of all allowed EIRPs of the initiating device.

In one or more of the preceding embodiments, a wireless device performs another LBT before continuing transmitting an extension part when the effective EIRP including the allocation in the extension exceeds the effective EIRP when the transmitter is used to contend for the channel.

An advantage of one or more embodiments of the present disclosure is a reduction in the interference. Additionally, in one or more embodiments, the Signal-to-Interference-plus-Noise Ratio (SINR) is not degraded at the receiver side when directional antennas are used at the transmitter and/or the receiver. Additionally, in one or more embodiments, reduced interference ensures more opportunities for spatial sharing among nodes sharing the same unlicensed band. Additionally, in one or more embodiments, the joint CCA at all potential receiving directions helps to mitigate the hidden node problem. The energy detection (ED) threshold related to effective antenna gain encourages transmitters equipped with larger antenna gains (i.e., a narrow beam). Additionally, in one or more embodiments, the disclosed methods reduce the interference at an unexpected area while maintaining a given SINR at the receiver side. Additionally, in one or more embodiments, reduced interference ensures more opportunities for spatial sharing among nodes sharing the same unlicensed band.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
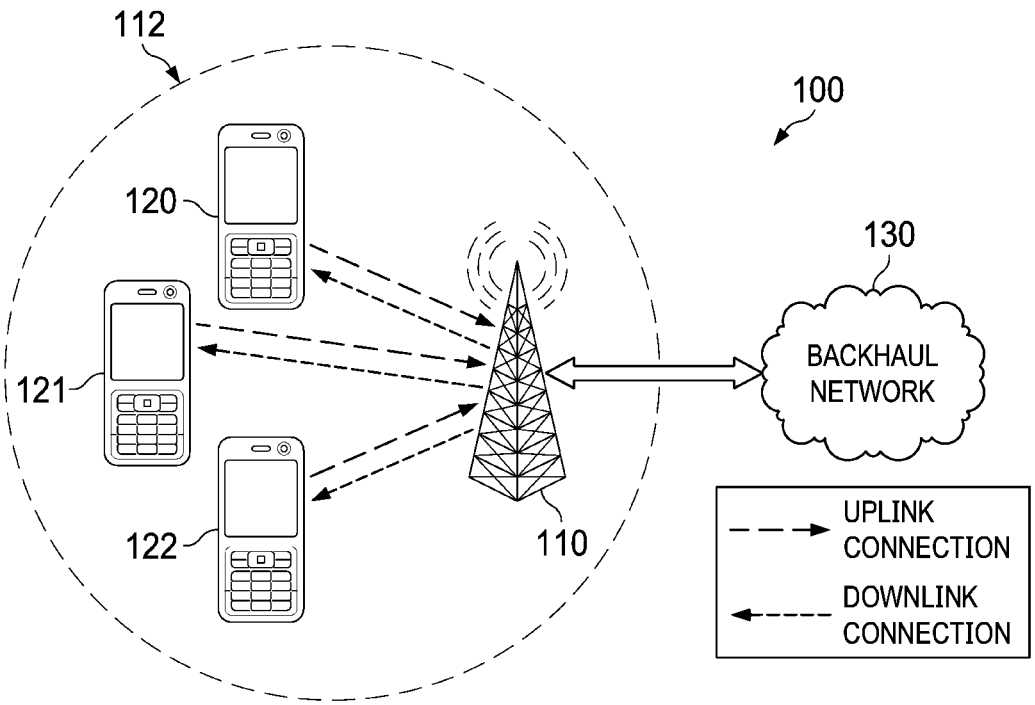
FIG. 1 illustrates an embodiment network for communicating data in which the disclosed methods and systems may be implemented.

The making and using of the various embodiments are discussed in detail below. It should be appreciated, however, that the present disclosure provides many applicable inventive concepts that can be embodied in a wide variety of specific contexts. The specific embodiments discussed are merely illustrative of specific ways to make and use the invention, and do not limit the scope of the invention.

Disclosed herein are systems, apparatuses, and methods to set a CCA or LBT threshold when a transmitter and/or a receiver are using directional transmission/reception antennas. Also disclosed herein are systems, apparatuses, and methods for energy detection and for adjusting the CCA threshold when one or more directional antennas are used at the transmitter and/or the receiver. The directional transmission/reception can be achieved with directional antenna(s) or beamforming with an antenna array. In an embodiment, the initiating device senses the channel occupancy through the level of energy detected, $P_r$, assuming 0 dBi antenna gain at the receiver side. The initiating device compares the level of the energy detected, $P_r$, with an energy detection threshold. The energy detection threshold is adaptive to the transmit power and to effective transmitter antenna gain when transmitting. In an embodiment, the effective transmitter antenna gain may not be exactly the same as the antenna gain of the hardware. The effective transmitter gain may depend on one or more of the narrow sense antenna gain, the number of antennas, and the beamforming vectors, as well as other factors.

In an embodiment, when directional reception is used, channel sensing is carried out by the collocated Transmission and Receiving Point (TRP) sectors using quasi-omni directional beams. As used herein, the term "sector" refers to a service coverage area provided by an evolved NodeB (eNB). CCA is carried out individually and a decision of whether to transmit will be carried out according to the CCA results from one or multiple TRPs. In another embodiment, when directional reception is used, channel sensing is performed by beam sweeping each of a plurality of directions during a respective time slot using analog beamforming. In another embodiment, the coverage area is divided into directions and channel sensing is performed using multiple parallel sensing of a plurality of directions during a single time slot using digital beamforming. In another embodiment, the sensing of different beams using digital beamforming is interlaced in the frequency domain.

In an embodiment, the detected energy is normalized. In an embodiment, the detected energy is normalized by dividing the detected energy by the antenna gains of the receive antenna. For example, if the detected energy is −40 dBm and the antenna gain of the receiving antenna is 20 dBi, the normalized detecting energy is −60 dBm.

An advantage of one or more embodiments of the present disclosure is a reduction in interference. Additionally, in one or more embodiments, the Signal-to-Interference-plus-Noise Ratio (SINR) is not degraded at the receiver side when directional antennas are used at the transmitter and/or the receiver. Additionally, in one or more embodiments, reduced interference ensures more opportunities for spatial sharing among nodes sharing the same unlicensed band. Additionally, in one or more embodiments, the joint CCA at all potential receiving directions helps to mitigate the hidden node problem. The ED threshold related to effective antenna gain encourages transmitters equipped with larger antenna gains (i.e., a narrow beam). Additionally, in one or more embodiments, the disclosed methods reduce the interference at an unexpected area while maintaining a given SINR at the receiver side. Additionally, in one or more embodiments, reduced interference ensures more opportunities for spatial sharing among nodes sharing the same unlicensed band.

FIG. 1 illustrates an embodiment network 100 for communicating data, in which the disclosed methods and systems may be implemented. The network 100 includes a plurality of network components. The network components may include an access point (AP), a user equipment (UE), or any other wireless reception point. In an embodiment, the network 100 includes an access point (AP) 110 having a coverage area 112, a plurality of UEs 120-122, and a backhaul network 130. In various embodiments, the AP 110 may be a transmission and reception point (TRP), a base station (BS), a base transceiver station (BTS), an e Node B (eNB), a next-generation NodeB (sometimes called a gNB), a wireless router and the like. Thus, the AP 110 may include any component capable of providing wireless access by, inter alia, establishing uplink (dashed line) and/or downlink (dotted line) connections with the UEs 120-122. The UEs 120-122 may include any component capable of establishing a wireless connection with the AP 110. Examples of UEs 120-122 include mobile phones, tablet computers, and laptop computers. The backhaul network 130 may be any component or collection of components that allow data to be exchanged between the AP 110 and a remote end (not shown). In some embodiments, the network 100 may include various other wireless devices, such as relays, femtocells, etc.

The components in network 100 may communicate using unlicensed band channels. In order to transmit on an unlicensed band, each of the UEs 120-122 and AP 110 must determine whether the channel is clear or occupied through, for example, CCA or LBT. In an embodiment, one or more of the UEs 120-122 and the AP 110 include directional antennas (or perform transmission/reception beamforming) to enhance the coverage at both the transmitter and the receiver. The initiating device (e.g., one of UEs 120-122 or AP 110) senses the channel occupancy through the level of energy detection, $P_r$, assuming, in an embodiment, a 0 dBi antenna gain at the receiver side. In an embodiment, the energy detection $P_r$ is in all receiving directions. The initiating device compares the $P_r$ with an energy detection threshold. In an embodiment, the energy detection threshold ($ED_{thrd}$) is dynamically determined according to the transmit power and/or according to the transmitter antenna gain when the initiating device is transmitting. If the energy detected is smaller than the energy detection threshold, then the initiating device determines that the channel is clear and may proceed to transmit. In an embodiment, the channel may be clear for one direction, but not for another. In such a case, the initiating device may transmit in a direction in which the channel is clear, but not in a direction in which the channel is not clear.

In an embodiment, the potential transmitter compares the energy detection $P_r$ with an energy detection threshold. In an aspect, the energy detection threshold is adaptive to the transmit power and effective TX antenna gain in the following transmission. Thus, in an aspect, $ED_{thrd}=X+Y-\min(Y, P_{out}+a*G_{TX})$ where the units are dBm. "X" is a predefined parameter related to the CCA level, e.g., −47 or −48 dBm. "Y" is a predefined parameter related to the maximum Equivalent Isotropically Radiated Power (EIRP) limits, e.g., 40 dBm in an indoor environment. "$P_{out}$" is the transmit power. "$G_{TX}$" is the effective transmit antenna gain at the initiating device. "a" is a parameter that gives an advantage to devices with larger antenna gains. In an aspect, when a=1, $P_{out}+a*G_{TX}$ is equal to the EIRP.

In a first embodiment, the $ED_{thrd}$ is derived according to the maximum of the antenna gain within burst or the Channel Occupancy Time (COT) transmission immediately following a LBT. The antenna gain includes an element factor and an array factor. In an embodiment, the element factor and the array factor are provided in units of dB. The element factor, $f_T$, is derived from the radiation pattern at the transmission direction. The array factor, $W_{TX}$, is derived from the beam forming vector. $W_{TX}=0$ dB if only one antenna element is used when transmitting. $\vec{w}(\theta_j,\varphi_j)$ is the beamforming vector used in the following COT. The effective antenna gain, $G_{TX}$, is determined according to $G_{TX}=\max_{j\in J}\{f_T(\theta_j,\varphi_j)+W_{TX}(\vec{w}(\theta_j,\varphi_j))\}$. It is assumed that J beamforming vectors are used in the MCOT. In an embodiment, the ED threshold is derived based on the maximum transmit antenna gain of the initiating device. In this case, $\vec{w}_i$ are the beamforming vectors available at the initiating device and the effective transmit antenna gain at the initiating device is given as $G_{TX}=\max_{\theta,\varphi}\{f_T(\theta,\varphi)+W_{TX}(\vec{w}_i(\theta,\alpha))\}$.

The beamforming vector for a phased antenna array is defined as $w=w_h \otimes w_v$, $w_v$ is a vector of length m and $w_h$ is a vector of length n. Each term of $w_v$ is given by:

$$w_{m,v} = \frac{1}{\sqrt{M}} \exp\left(-j\frac{2\pi}{\lambda}(m-l)d_V \cos\theta_V\right) \text{ for } m = 1, \ldots, M,$$

and
each term of $w_h$ is given by:

$$w_{n,h} = \frac{1}{\sqrt{N}} \exp\left(-j\frac{2\pi}{\lambda}(n-l)d_H \sin\vartheta_H\right) \text{ for } n = 1, \ldots, N.$$

The DFT beam candidate is generated according to the uniform vertical and horizontal angular distribution, e.g., $$M = N = 4, \theta_V = \left[\frac{\pi}{8}, \frac{3\pi}{8}, \frac{5\pi}{8}, \frac{7\pi}{8}\right], \vartheta_H = \left[\frac{\pi}{8}, \frac{3\pi}{8}, \frac{5\pi}{8}, \frac{7\pi}{8}\right].$$

The array gain is $10 \log_{10}$ (MN) if it is normalized by the input energy of the antenna array. In an aspect, the array gain is obtained as follows. Table 1 below is an example of an antenna pattern. One "X" corresponds to a pair of cross polarization antennas. "M" is the number of row and "N" is the number of column of the planar antenna array. In table 1, there are a total of 2×M×N antenna elements.

TABLE 1

| X<br>(M−1,0) | X<br>(M−1,1) | ... | X<br>(M−1,N−1) |
|---|---|---|---|
| ⋮ | ⋮ | ... | ⋮ |
| X<br>(1,0) | X<br>(1,1) | ... | X<br>(1,N−1) |

TABLE 1-continued $$X_{(0,0)} \quad X_{(0,1)} \quad \ldots \quad X_{(0,N-1)}$$

A table showing an example of beam gain for beam ID and beam direction is shown in Table 2 below. The values in Table 2 are calculated according to equations defined in IEEE 802.11-09/0334r8 which is incorporated herein by reference as if reproduced in its entirety.

TABLE 2

| Beam ID | Beam Direction | Gain (dBi) |
|---|---|---|
| 1 | $\theta = \frac{\pi}{8}, \vartheta = -\frac{3\pi}{8}$ | 13.8446 |
| 2 | $\theta = \frac{\pi}{8}, \vartheta = -\frac{\pi}{8}$ | 13.2005 |
| 3 | $\theta = \frac{\pi}{8}, \vartheta = \frac{\pi}{8}$ | 13.2005 |
| 4 | $\theta = \frac{\pi}{8}, \vartheta = \frac{3\pi}{8}$ | 13.8446 |
| 5 | $\theta = \frac{3\pi}{8}, \vartheta = -\frac{3\pi}{8}$ | 16.1660 |
| 6 | $\theta = \frac{3\pi}{8}, \vartheta = -\frac{\pi}{8}$ | 13.5308 |
| 7 | $\theta = \frac{3\pi}{8}, \vartheta = \frac{\pi}{8}$ | 13.5308 |
| 8 | $\theta = \frac{3\pi}{8}, \vartheta = \frac{3\pi}{8}$ | 16.1660 |
| 9 | $\theta = \frac{5\pi}{8}, \vartheta = -\frac{3\pi}{8}$ | 16.1660 |
| 10 | $\theta = \frac{5\pi}{8}, \vartheta = -\frac{\pi}{8}$ | 13.5308 |
| 11 | $\theta = \frac{5\pi}{8}, \vartheta = \frac{\pi}{8}$ | 13.5308 |
| 12 | $\theta = \frac{5\pi}{8}, \vartheta = \frac{3\pi}{8}$ | 16.1660 |
| 13 | $\theta = \frac{7\pi}{8}, \vartheta = -\frac{3\pi}{8}$ | 13.84446 |
| 14 | $\theta = \frac{7\pi}{8}, \vartheta = -\frac{\pi}{8}$ | 13.2005 |
| 15 | $\theta = \frac{7\pi}{8}, \vartheta = \frac{\pi}{8}$ | 13.2005 |
| 16 | $\theta = \frac{7\pi}{8}, \vartheta = \frac{3\pi}{8}$ | 13.8446 |

In an aspect, the array gain is obtained as shown in Table 3 below assuming M=N=4, if it is normalized by the radiation energy of the array.

TABLE 3

| $\theta_v$ | $\theta_h$ | | | |
|---|---|---|---|---|
| | $\pi/8$ | $3\pi/8$ | $5\pi/8$ | $7\pi/8$ |
| $\pi/8$ | 12.72 | 15.85 | 16.18 | 17.49 |
| $3\pi/8$ | 15.85 | 15.78 | 16.44 | 16.18 |
| $5\pi/8$ | 16.18 | 16.44 | 15.78 | 15.85 |
| $7\pi/8$ | 17.49 | 16.18 | 15.85 | 12.72 |

The array gain is obtained as shown in Table 4 below assuming M=4, N=8, if it is normalized by the radiation energy of the array.

TABLE 4

| $\theta_v$ | $\theta_h$ | | | | | | | |
|---|---|---|---|---|---|---|---|---|
| | $\pi/16$ | $3\pi/16$ | $5\pi/16$ | $7\pi/16$ | $9\pi/16$ | $11\pi/16$ | $13\pi/16$ | $15\pi/16$ |
| $\pi/8$ | 14.90 | 15.82 | 18.31 | 19.31 | 19.37 | 19.47 | 20.47 | 20.06 |
| $3\pi/8$ | 19.01 | 18.34 | 18.83 | 19.26 | 19.52 | 19.71 | 19.54 | 19.26 |
| $5\pi/8$ | 19.26 | 19.54 | 19.71 | 19.52 | 19.26 | 18.83 | 18.84 | 19.01 |
| $7\pi/8$ | 20.06 | 20.47 | 19.47 | 19.37 | 19.31 | 18.31 | 15.82 | 14.90 |

The array gain is obtained as shown in Table 5 below assuming M=N=8, if it is normalized by the radiation energy of the array.

TABLE 5

| $\theta_v$ | $\theta_h$ | | | | | | | |
|---|---|---|---|---|---|---|---|---|
| | $\pi/16$ | $3\pi/16$ | $5\pi/16$ | $7\pi/16$ | $9\pi/16$ | $11\pi/16$ | $13\pi/16$ | $15\pi/16$ |
| $\pi/16$ | 17.32 | 18.74 | 21.6 | 22.6 | 22.63 | 22.21 | 22.32 | 24.77 |
| $3\pi/16$ | 18.74 | 19.57 | 21.32 | 22.56 | 22.66 | 22.79 | 23.59 | 22.32 |
| $5\pi/16$ | 21.6 | 21.32 | 21.55 | 22.51 | 22.69 | 23.04 | 22.79 | 22.21 |
| $7\pi/16$ | 22.6 | 22.56 | 22.51 | 22.50 | 22.69 | 22.69 | 22.66 | 22.63 |
| $9\pi/16$ | 22.63 | 22.66 | 22.69 | 22.69 | 22.50 | 22.51 | 22.56 | 22.60 |
| $11\pi/16$ | 22.21 | 22.79 | 23.04 | 22.69 | 22.51 | 21.55 | 21.32 | 21.60 |
| $13\pi/16$ | 22.32 | 23.59 | 22.79 | 22.66 | 22.56 | 21.32 | 19.57 | 18.74 |
| $15\pi/16$ | 24.77 | 22.32 | 22.21 | 22.63 | 22.60 | 21.60 | 18.74 | 17.32 |

In an embodiment, the effective antenna gain can also include a factor related to the relative beamwidth in the units of dB. For example, the effective antenna gain can be defined as $G_{TX}=\max_{j\in J}\{f_T(\theta_j,\varphi_j)+W_{TX}(\vec{w}(\theta_j,\varphi_j))-BW(\vec{w}(\theta_j,\varphi_j))\}$. The relative beam width is $BW(\vec{w}(\theta_j,\varphi_j))=A(\vec{w}(\theta_j,\varphi_j))/4\pi$, where A is the solid angle with the antenna gain larger than a predefined threshold, e.g., 0 dBi. In an embodiment, the effective antenna gain is determined by a mean of antenna gains of multiple beamforming vectors according to:

$$G_{TX} = 10\log\left(\Sigma_i \frac{k_i n_i}{N} \sum_{s=0}^{S_i-1} \frac{1}{S_i} \hat{G}_{s,i}\right),$$

where $k_i$ is the size of the time resource and $n_i$ is the size of the frequency resource assigned in the allocation i in terms of resource unit, N is the duration of the transmission burst before carrying on additional Listen-Before-Talk (LBT) within a channel occupancy time (COT), $S_i$ is the number of spatial layer of resource allocation i, and $\hat{G}_{s,i}$ is the antenna gain of the beamforming vector of the spatial layers of the allocation i in the linear domain. In an embodiment, the effective antenna gain is determined by a mean of antenna gains of usable beamforming vectors of the device according to:

$$G_{TX}=\text{mean}_i(10 \log(\hat{G}_i)),$$

where $\hat{G}_i$ the antenna gain of usable beamforming vector of the initiating device in the linear domain.

Use of directional sensing by the initiating device increases the likelihood of a hidden node. In an embodiment, when directional antennas are used, one of the following methods is used for channel sensing.

Figure 2:
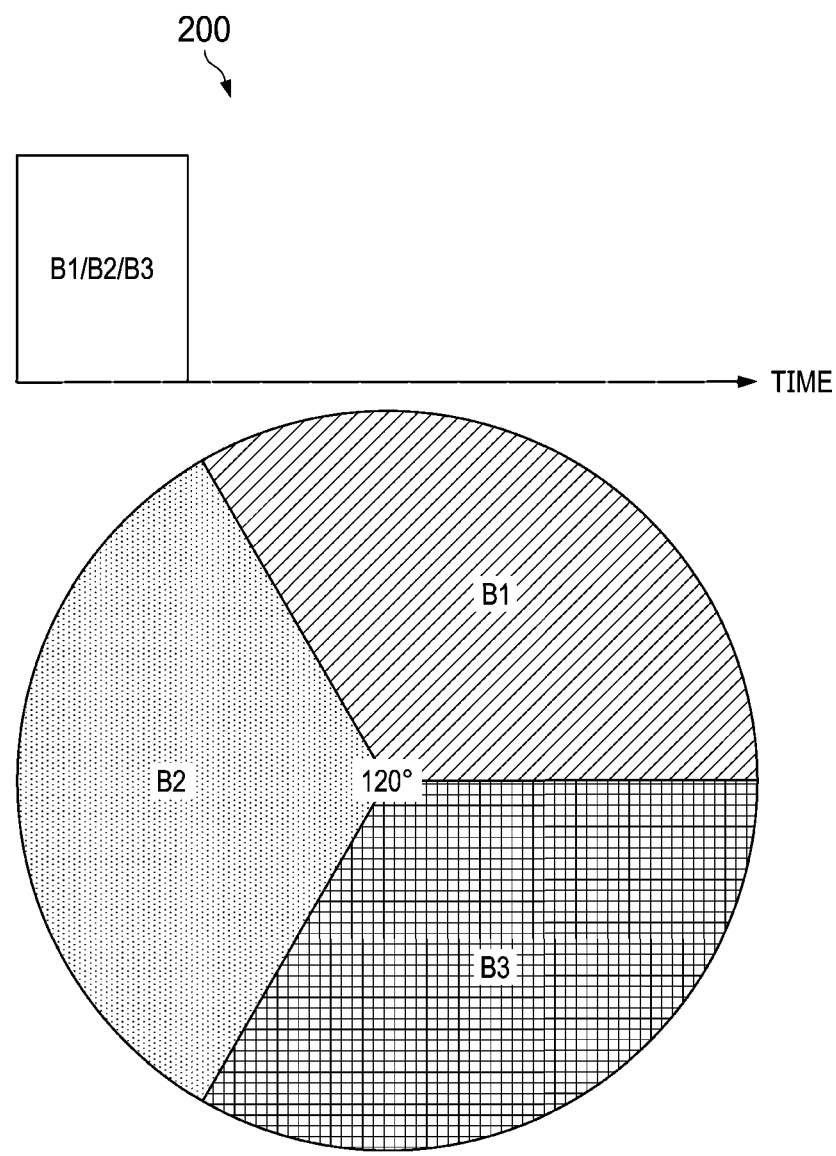
FIG. 2 is a diagram illustrating an embodiment of a system according to a first option for channel sensing using directional antennas.

FIG. 2 is a diagram illustrating an embodiment of a system 200 according to a first option for channel sensing using directional reception. In the system 200, joint CCA is carried out across the collocated TRPs each serving a corresponding one of sectors B1, B2, B3 with wider/quasi-omni direction beams as illustrated. In one embodiment, the area to be covered for channel sensing is divided into wide sectors B1, B2, B3 with each beam covering a respective one of the sectors B1, B2, B3. In the depicted example, each sector B1, B2, B3 covers 120 degrees of the total area. In other embodiments, the area can be divided into more or fewer sectors. Channel sensing in each sector B1, B2, B3 is performed at approximately the same time. In an embodiment, three antenna arrays are used to serve three sectors B1, B2, B3, with each antenna array covering one of the sectors B1, B2, B3. In other embodiments, other numbers of sectors and antenna arrays may be used, with each sector being served by its own antenna array. In an embodiment, each antenna array may be a single antenna.

Figure 3:
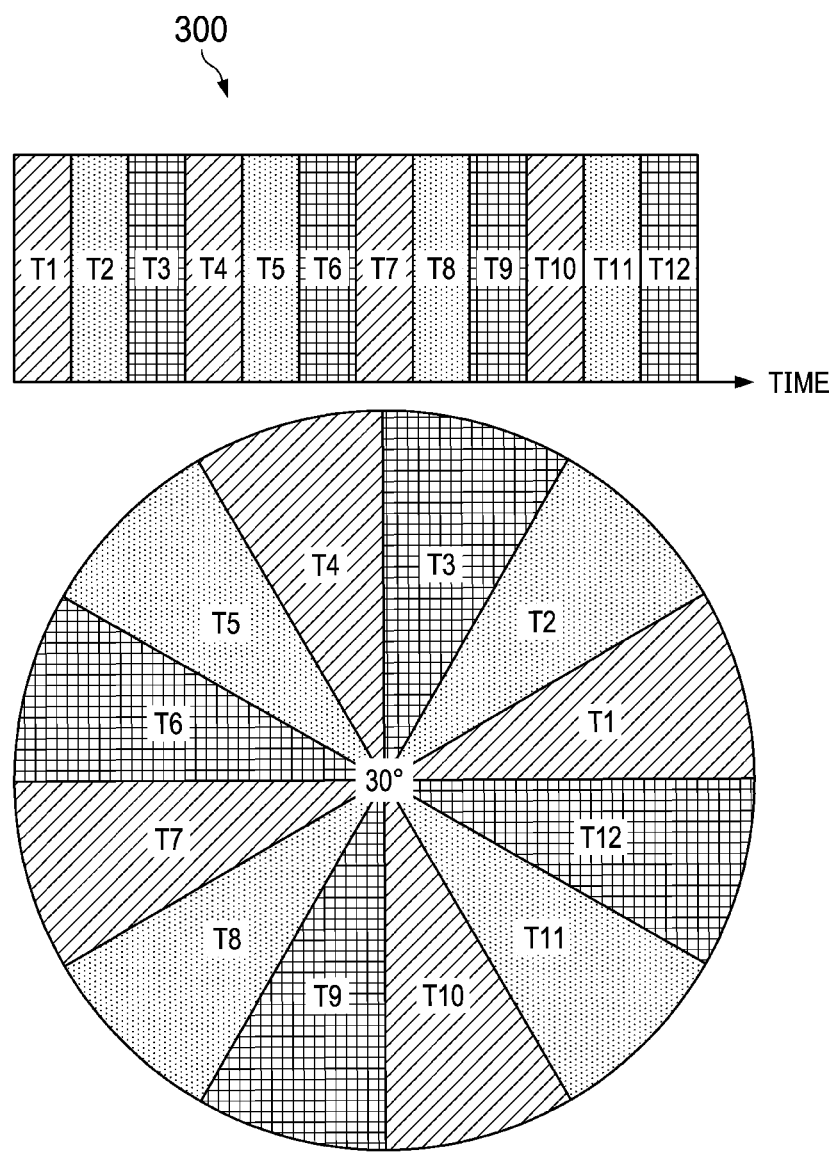
FIG. 3 is a diagram illustrating an embodiment of a system according to a second option for channel sensing using directional antennas.

FIG. 3 is a diagram illustrating an embodiment of a system 300 according to a second option for channel sensing using directional reception. In the system 300, channel sensing is performed with beam sweeping every one or more time slots to detect a plurality of energy levels corresponding to a plurality of beamforming directions. Each beam covers a subsection of the total 360 degree area to be covered. In the depicted example, each beam covers a 30 degree range. However, in other embodiments, the area can be divided into larger or smaller beams. Each of the one or more time slots corresponds to a different receiving direction. In an embodiment, the channel sensing uses analog beamforming.

Figure 4:
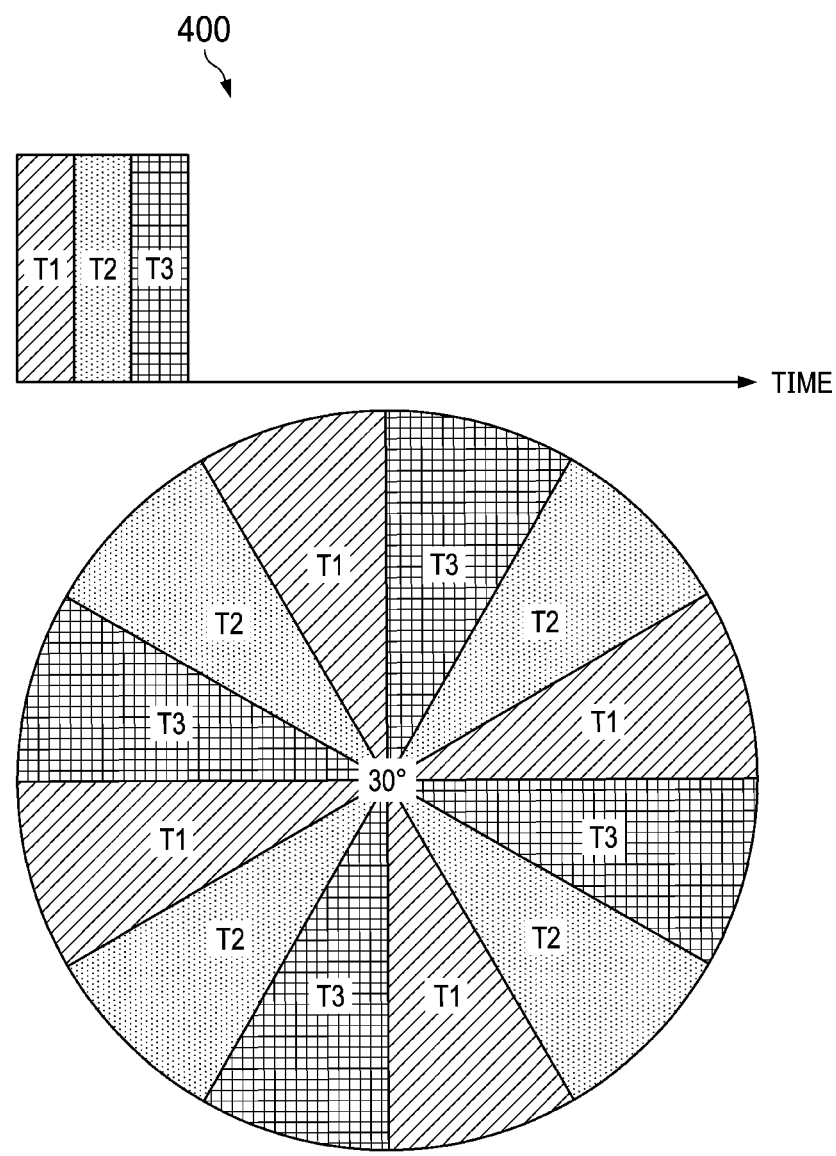
FIG. 4 is a diagram illustrating an embodiment of a system according to a third option for channel sensing using directional antennas.

FIG. 4 is a diagram illustrating an embodiment of a system 400 according to a third option for channel sensing using directional antennas. In the system 400, multiple parallel sensing is performed in which channel sensing is performed for multiple directions in each time slot. In an embodiment, the channel sensing uses digital beamforming.

Figure 5:
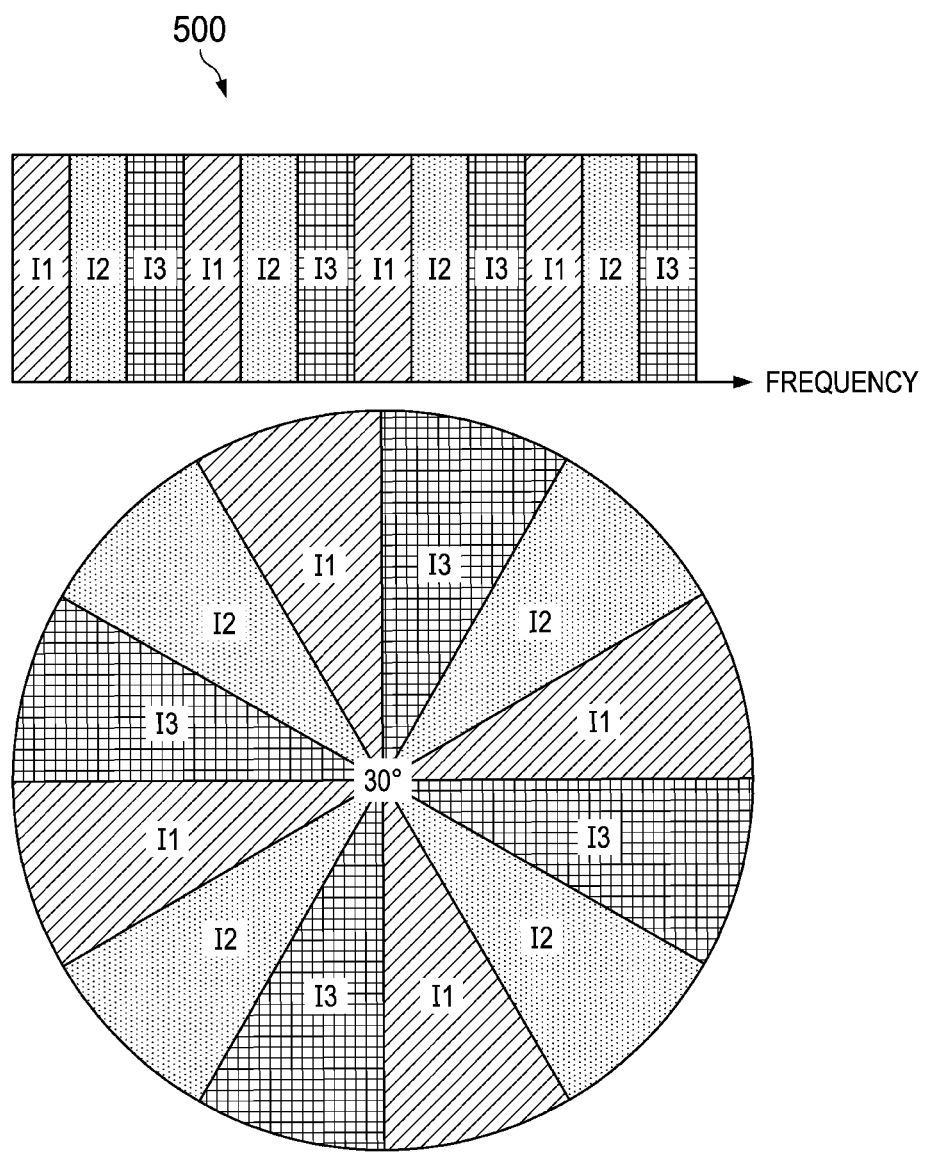
FIG. 5 is a diagram illustrating an alternate embodiment of a system according to a third option for channel sensing using directional antennas.

FIG. 5 is a diagram illustrating an alternate embodiment of a system 500 according to a third option for channel sensing using directional reception. In the system 500, the sensing of different beams is interlaced in the frequency domain.

In another embodiment, the ED threshold can be derived based on the maximum transmit power of the initiating device.

In another embodiment, the ED threshold is derived based on the maximum of transmit power following the LBT.

In another embodiment, the initiating device judges the channel condition (busy or clear) based on the multiple CCA results at different directions. For example, if channel sensing along the transmission direction is clear, the channel of transmission is considered to be clear. In another example, if more than X % of directional CCA results including the transmission direction are clear, then the channel can be regarded as clear. In another example, if the CCA at the direction including the transmission direction and its reverse direction are clear, the channel can be regarded as clear. In an aspect, the initial device compares the maximum or average of the multiple CCA results from different directions with the threshold. The maximum or average CCA can be carried out on the CCA result of the direction of interest.

In an embodiment, assuming the same EIRP at the initiating devices, the $G_{TX}$ term is weighted toward the devices with larger transmit antenna gain (i.e., narrow beam). In an embodiment, the parameter "a" preceding the "$G_{TX}$" term is smaller than 1, e.g., 0.5.

In an aspect, the ED threshold is derived based on the maximum antenna gain of an initiating device where:

$$G_{TX} = \max_{\theta,\varphi}\{f_T(\theta, \varphi) + W_{TX}(\vec{w}(\theta, \varphi))\}$$

In an aspect, the ED threshold is derived based on the maximum of antenna gains following the LBT given by:

$$G_{TX} = \max_j\{f_T(\theta_j, \varphi_j) + W_{TX}(\vec{w}(\theta_j, \varphi_j))\}$$

where j is the index of resource allocation.

Figure 6:
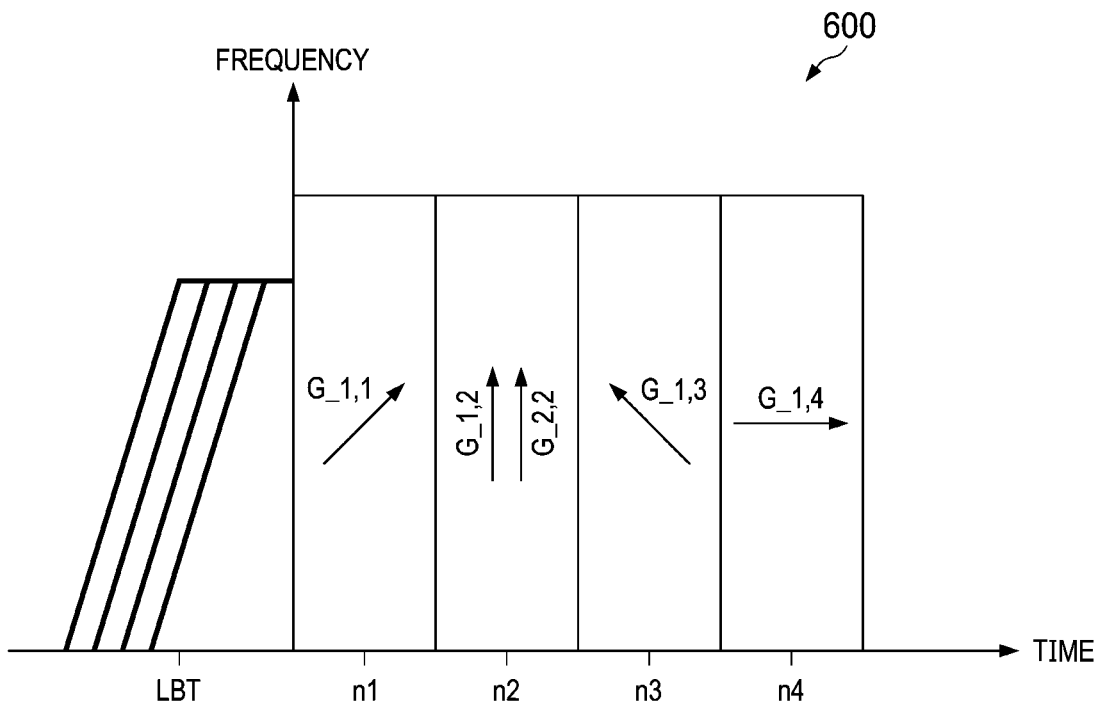
FIG. 6 is a diagram of an example embodiment of a transmission burst after LBT which includes multiple consecutive resource allocation in the time domain.

FIG. 6 is a diagram 600 of an example embodiment of a transmission burst after LBT which includes multiple consecutive resource allocation in the time domain. The transmission direction of at least one of the resource allocations is different from the others. The arrows in the block represent the transmission direction of the corresponding resource allocation in the transmission burst. Multiple arrows in one block represent multiple layers in one resource allocation.

Figure 7:
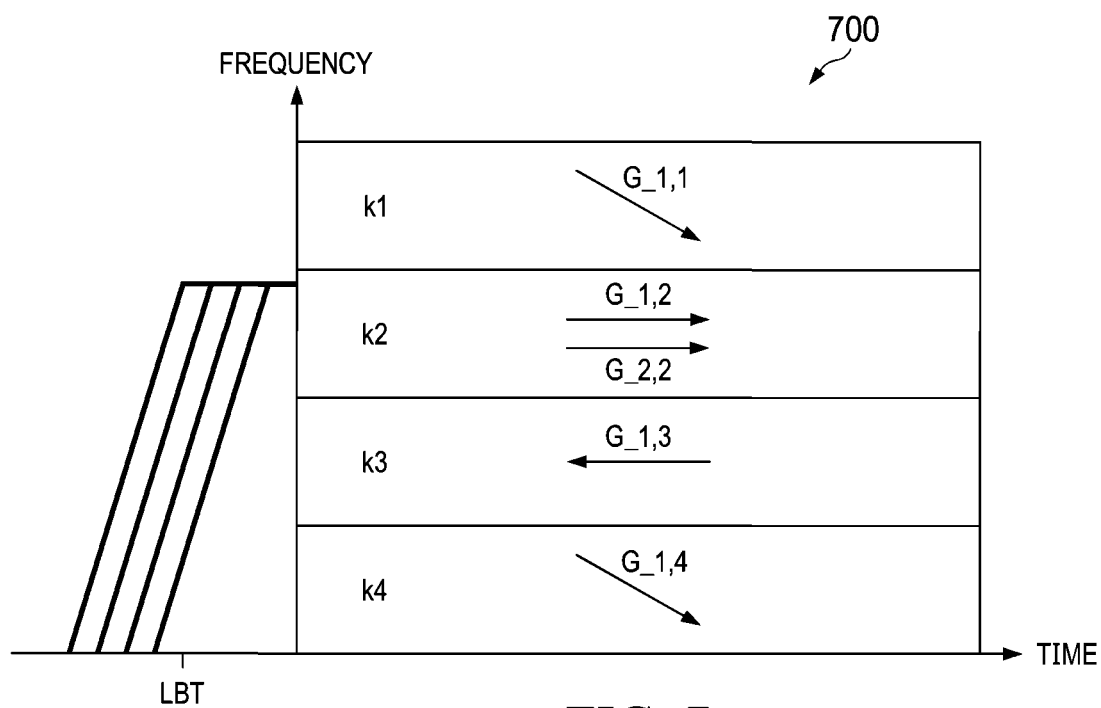
FIG. 7 is a diagram of an example embodiment of multiple resource allocation in the frequency domain.

FIG. 7 is a diagram 700 of an example embodiment of multiple resource allocation in the frequency domain. The transmission direction of at least one of the resource allocations is different from the others. The arrows in the block represent the transmission direction on the corresponding resource allocation in the transmission burst.

Figure 8:
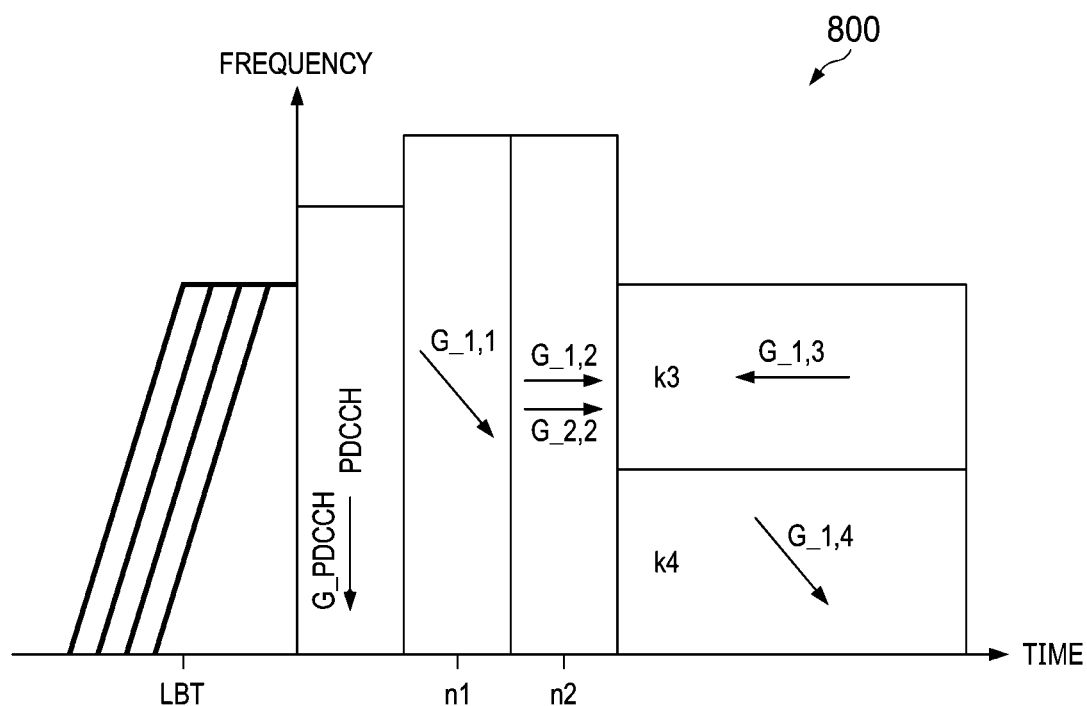
FIG. 8 is a diagram of an example embodiment of a transmission burst after LBT which includes a combination of one control channel and multiple consecutive resource allocations in the time and frequency domains.

FIG. 8 is a diagram 800 of an example embodiment of a transmission burst after LBT which includes a combination of one or more control channels and multiple consecutive resource allocations in the time and frequency domains. In an aspect, the gNB uses different beamforming for the control channel than the beamforming utilized for the data channel. The arrows in the block represent the transmission direction on the corresponding resource allocation in the transmission burst. Multiple arrows in one block represent multiple layers in one resource allocation.

In an embodiment, the ED threshold is derived based on the mean EIRP of the following transmission burst by $ED_{thrd}=X+Y-\min(Y, \text{mean}(EIRP))$. The mean EIRP of the transmission burst is calculated through the following equation:

$$\text{mean}_{burst}(EIRP) = 10\log\left(\sum_i \frac{k_i n_i}{N} \sum_s \hat{P}_{s,i} \hat{G}_{s,i}\right)$$

where $k_i$ is the size of the time resource and $n_i$ is the size of the frequency resource assigned in the allocation i in terms of resource unit. N is the duration of the transmission time before carrying on additional LBT within a channel occupancy time (COT). $\hat{P}_{s,i}$ is the transmit power on a per T/F unit of spatial layer s in a linear domain (i.e., in a linear unit such as mW, as opposed to a logarithmic unit such as dBm). $\hat{G}_{s,i}$ is the antenna gain of the beamforming vector of the spatial layers of the allocation i in the linear domain.

In an aspect, there are multiple allocations with different beamforming vectors in the transmission burst. In an aspect, the time unit is an OFDM symbol, slot, subframe, etc. In an aspect, the frequency resource unit is a physical resource block group (PRG), a resource block group (RBG), a subband, or a channel. In some allocations, multiple spatial layers are configured. In an aspect, the mean of the EIRP provides resources for control, reference signal (RS), and data.

In an aspect, the mean EIRP of an initiating device is determined according to:

$$\text{mean}_{device}(EIRP) = \text{mean}_{i,j}(10 \log(P_i \hat{G}_j)),$$

where $P_{max}$ is the maximum allowed transmit power of the initiating device in a linear domain, and $\hat{G}_j$ is the antenna gain of usable beamforming vector of the device in the linear domain.

In one or more of the preceding embodiments, the maximum EIRP of a transmission burst is determined according to:

$$\max_{burst}(EIRP) = \max_{k=0, \ldots, K-1}(10 \log(\Sigma_i n_{i,k} \Sigma_{s,k} \hat{P}_{s,i,k} \hat{G}_{s,i,k})),$$

where $k_i$ is the size of the time resource and $n_i$ is the size of the frequency resource assigned in the allocation i in terms of resource unit, N is the duration of the transmission burst before carrying on additional Listen-Before-Talk (LBT) within a channel occupancy time (COT), $\hat{P}_{s,i}$ is a transmit power on a per time or frequency unit of spatial layer s in a linear domain, and $\hat{G}_{s,i}$ is the antenna gain of the beamforming vector of the spatial layer s of the allocation i in the linear domain.

In one or more of the preceding embodiments, the maximum EIRP of an initiating device is determined according to:

$$\max_{device}(EIRP) = \max_{j=0, \ldots, J-1}(10 \log(P_{max} \hat{G}_j)),$$

where $P_{max}$ is the maximum allowed transmit power of the initiating device in a linear domain, and $\hat{G}_j$ is the antenna gain of usable beamforming vector of the device in the linear domain.

In an aspect, the transmitter extends a current continuous transmission burst without additional LBT when the ED threshold taking the extension into account is higher than the ED threshold of the ongoing burst used for channel access. Equivalently, the mean/max EIRP, taking into account the allocation in the extension, should not exceed the mean/max EIRP when the transmitter is used to contend for the channel. Otherwise, a new burst should be initiated following a successful LBT where the ED threshold is set by the mean EIRP of the new burst.

Figure 9:
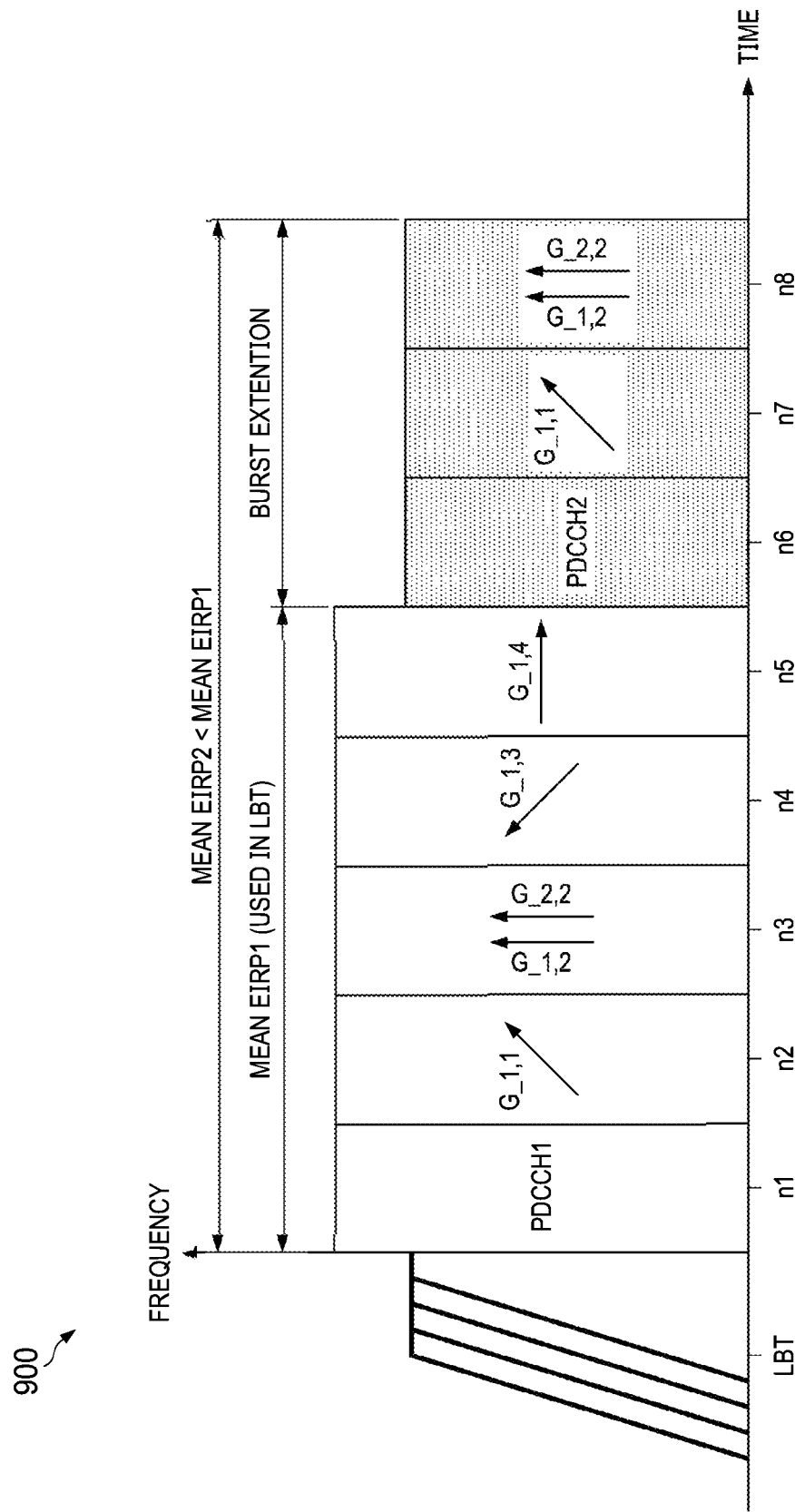
FIG. 9 is a diagram of an example embodiment of when the transmission burst after LBT can be extended without additional LBT.

FIG. 9 is a diagram 900 of an example embodiment of when the transmission burst after LBT can be extended without additional LBT. The ED threshold used at LBT immediately before the original transmission burst is based on the effective antenna gain or effective EIRP from resource allocation from n1 to n5. If the effective antenna gain or effective EIRP of the extension part (resource allocation n6 to n8) is not larger than that of n1 to n5 (or the effective antenna gain or effective EIRP including the resource allocation from n1 to n8 is not larger than that of from n1 to n5), the initiating device can continuously transmit n6 to n8 without any interruption or LBT.

Figure 10:
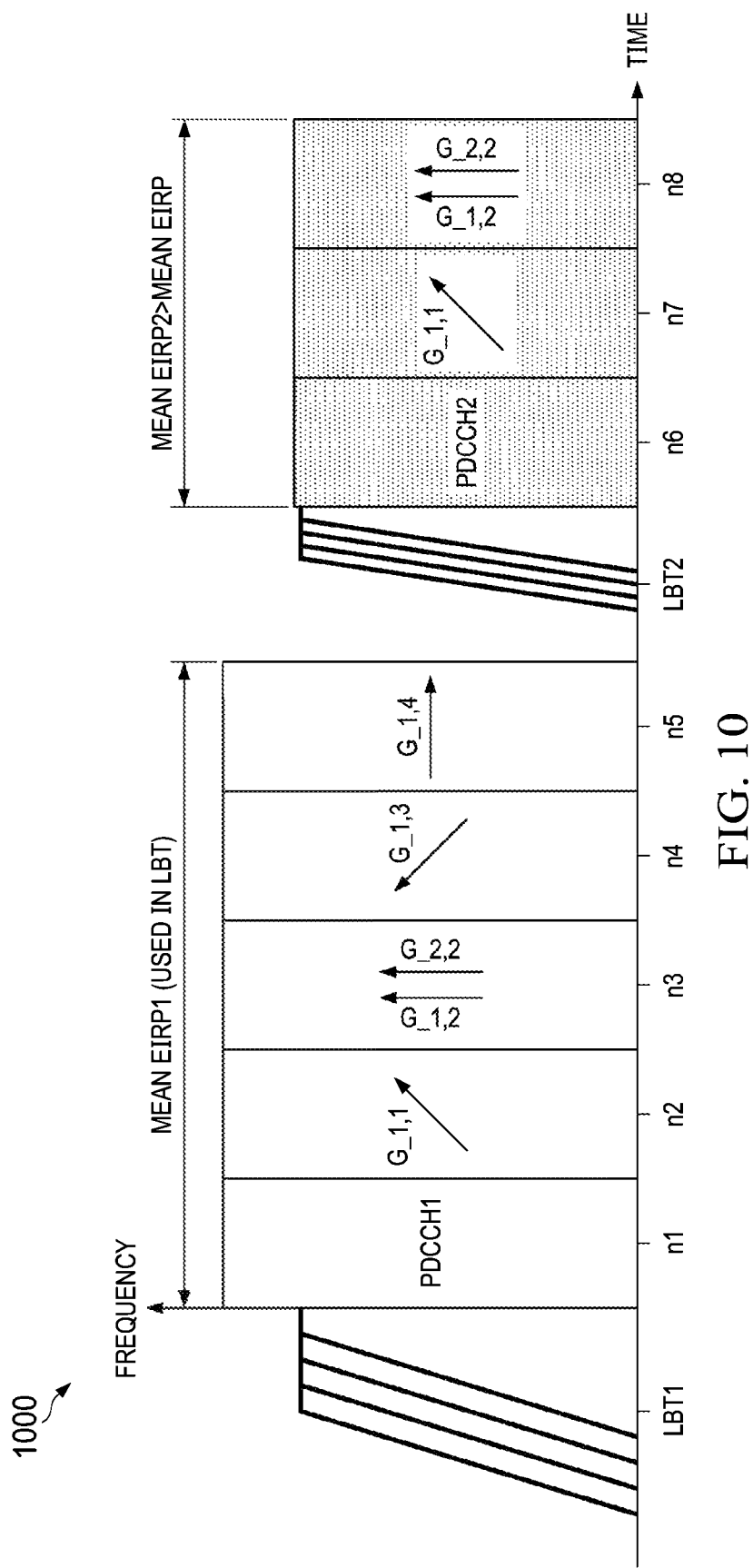
FIG. 10 is a diagram of an example embodiment of when the transmission burst should be interrupted.

FIG. 10 is a diagram 1000 of an example embodiment of when the transmission burst is interrupted. If the effective antenna gain or effective EIRP from resource allocation n6 to n8 is larger than that from n1 to n5, (or the effective antenna gain or effective EIRP including the resource allocation from n1 to n8 is larger than that of from n1 to n5), the ongoing burst is not extended. Additional LBT is required before the transmission of n6 to n8.

Figure 11:
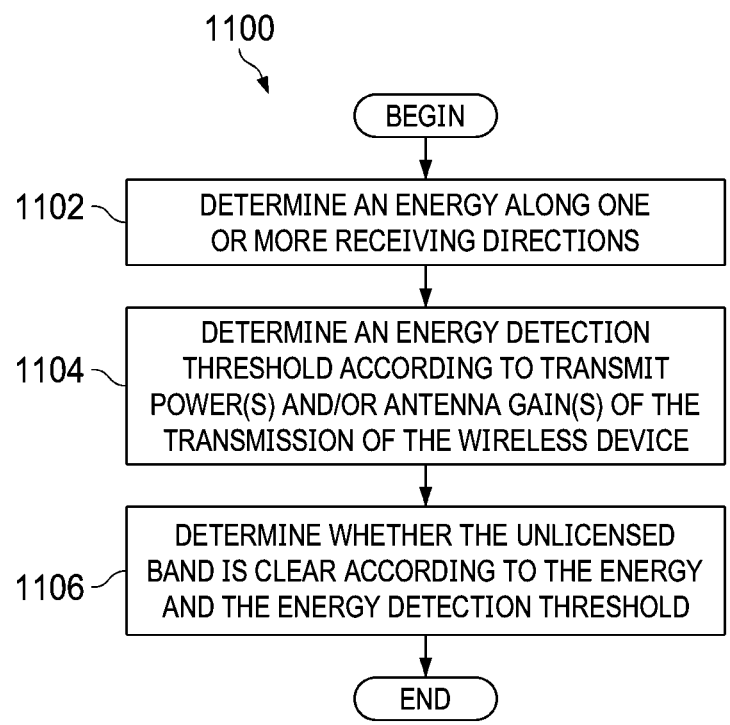
FIG. 11 is a flowchart of an embodiment of a method for determining whether a channel in an unlicensed band is clear.

FIG. 11 is a flowchart of an embodiment of a method 1100 for determining whether a channel in an unlicensed band is clear. The method begins at block 1102 where an energy along one or more receiving directions is determined. At block 1104, an energy detection threshold is determined according to transmit power(s) and/or antenna gain(s) of the transmission of the wireless device. At block 1106, a determination of whether the unlicensed band is clear is made according to the energy and the energy detection threshold, after which the method 1100 may end.

Figure 12:
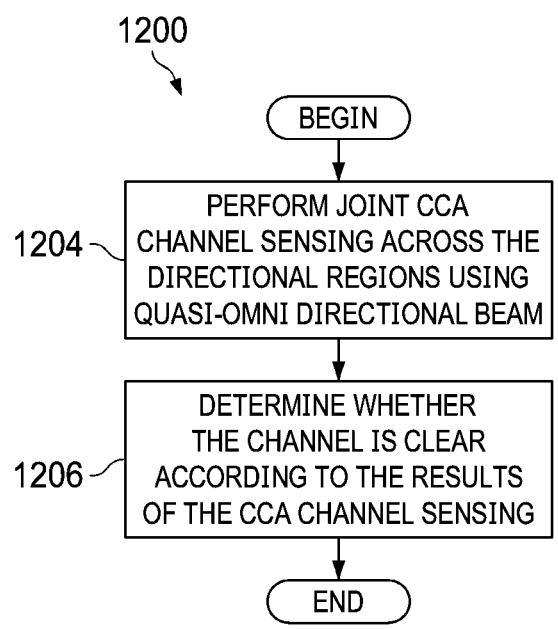
FIG. 12 is a flowchart of an embodiment of a method for determining whether a channel in an unlicensed band is clear.

FIG. 12 is a flowchart of an embodiment of a method 1200 for determining whether a channel in an unlicensed band is clear. The method 1200 begins at block 1204, in which joint CCA channel sensing across the directional regions is performed using quasi-omni directional beams. At block 1206, it is determined whether the channel is clear according to the results of the CCA channel sensing, after which the method 1200 may end. Each directional region covers an angular subset of the 360 degrees around the initiating device.

Figure 13:
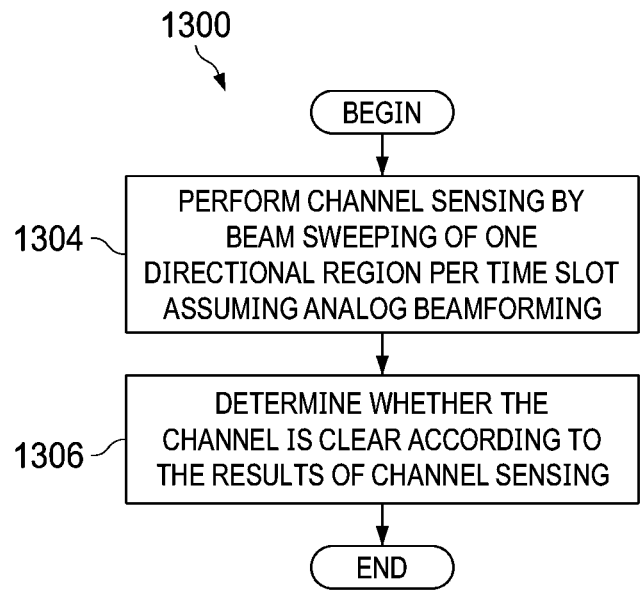
FIG. 13 is a flowchart of an embodiment of a method for determining whether a channel in an unlicensed band is clear.

FIG. 13 is a flowchart of an embodiment of a method 1300 for determining whether a channel in an unlicensed band is clear. The method 1300 begins at block 1304, in which channel sensing is performed using beam sweeping of one directional region per time slot assuming analog beamforming. At 1306, it is determined whether the channel is clear according to the results of the channel sensing, after which the method 1300 may end.

Figure 14:
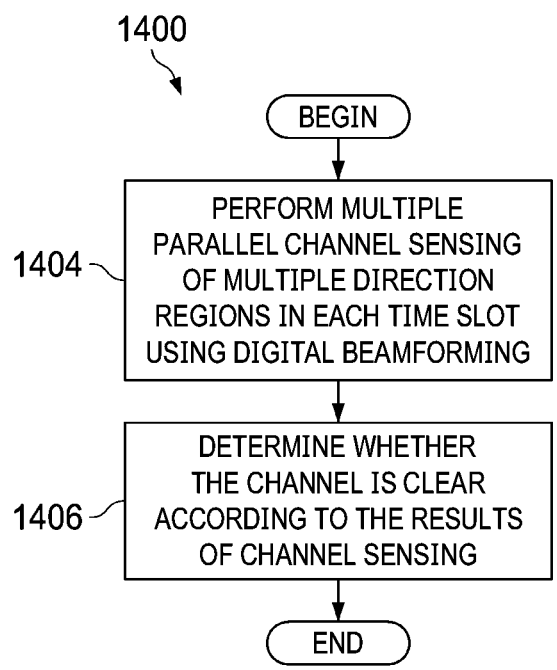
FIG. 14 is a flowchart of an embodiment of a method 900 for determining whether a channel in an unlicensed band is clear.

FIG. 14 is a flowchart of an embodiment of a method 1400 for determining whether a channel in an unlicensed band is clear. The method 1400 begins at block 1404, in which multiple parallel channel sensing of multiple directional regions is performed in each time slot using digital beamforming. At 1406, it is determined whether the channel is clear according to the results of the channel sensing, after which the method 1400 may end.

Figure 15:
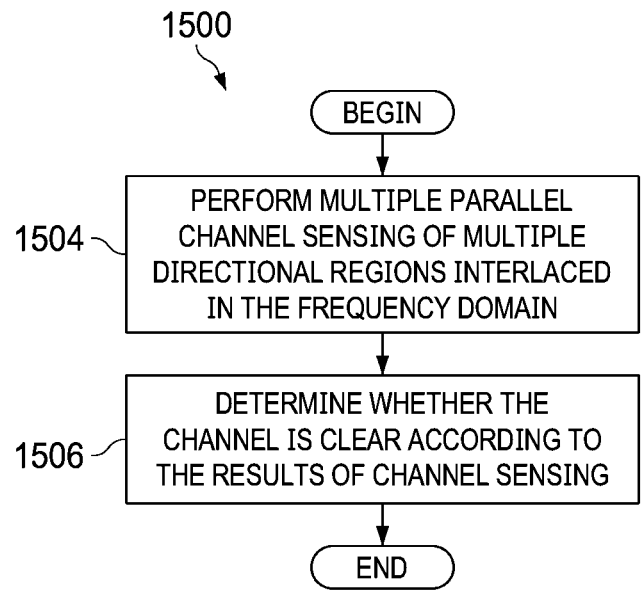
FIG. 15 is a flowchart of an embodiment of a method for determining whether a channel in an unlicensed band is clear.

FIG. 15 is a flowchart of an embodiment of a method 1500 for determining whether a channel in an unlicensed band is clear. The method 1500 begins at block 1504, in which sensing of different beams using digital beamforming is interlaced in the frequency domain. At 1506, it is determined whether the channel is clear according to the results of the channel sensing, after which the method 1500 may end.

Figure 16:
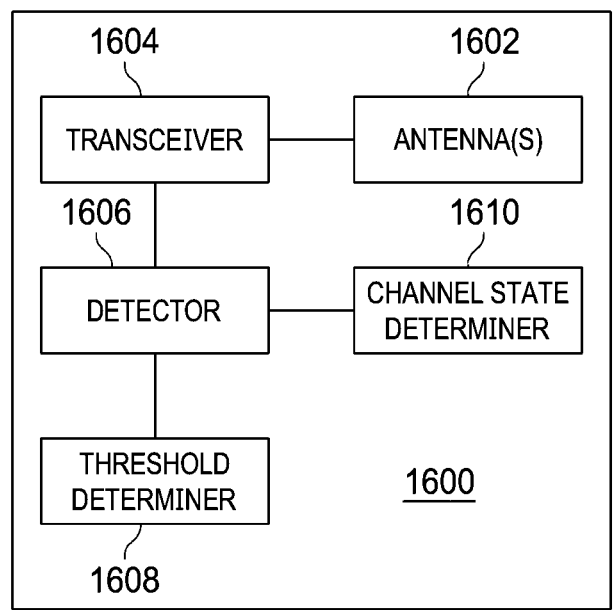
FIG. 16 is a block diagram of an embodiment of a system 1100 for determining whether an unlicensed band channel is clear using directional receiving and/or transmitting.

FIG. 16 is a block diagram of an embodiment of a system 1600 for determining whether an unlicensed band channel is clear using directional receiving and/or transmitting. System 1600 includes one or more antennas 1602, a transceiver 1604, a detector 1606, a threshold determiner 1608, and a channel state determiner 1610. The one or more antennas 1602 may include directional antennas or may include an array of antennas which may be used for analog or digital beamforming. The transceiver 1604 is configured to send and receive signals via the antennas 1602. The detector 1606 is connected to the antennas 1602 through the transceiver 1604. The detector is configured to detect an energy along various receiving directions and may be operable to implement the detection portion of any of the above described embodiments. The threshold determiner 1608 and the channel state determiner 1610 are connected to the detector 1606. The threshold determiner 1608 is configured to determine an energy detection threshold according to at least one of one or more transmit powers of the wireless device or one or more transmit antenna gains of the wireless device. The channel state determiner 1608 is configured to determine whether the unlicensed band channel is clear in at least the one receiving direction according to the energy and the energy detection threshold. The threshold determiner 1608 and the channel state determiner 1610 may be operable to implement portions of any of the above described embodiments. In an embodiment, at least some portions of the detector 1606, the threshold determiner 1608, and the channel state determiner are implemented in software. In an embodiment, at least some portions of the detector 1606, the threshold determiner 1608, and the channel state determiner are implemented in hardware.

Figure 17:
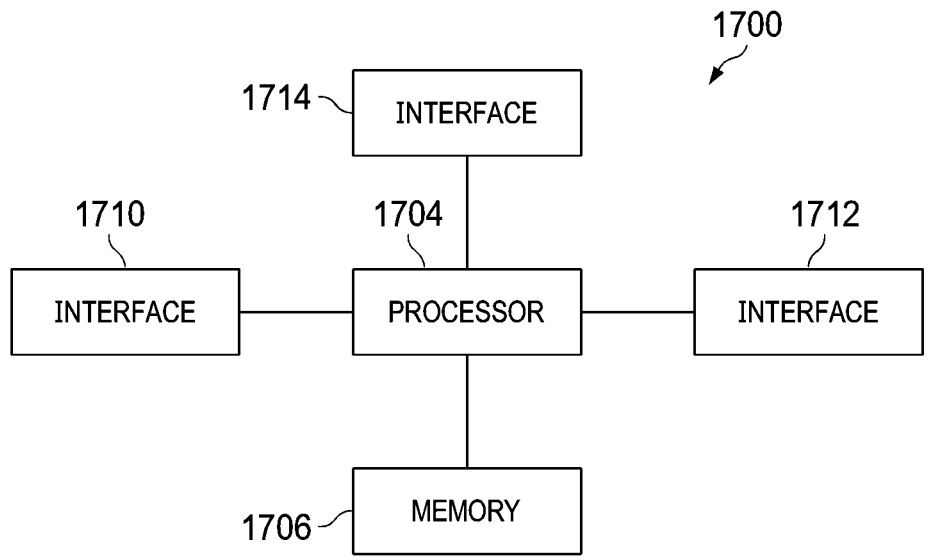
FIG. 17 illustrates a block diagram of an embodiment processing system for performing methods described herein.

FIG. 17 illustrates a block diagram of an embodiment processing system 1700 for performing methods described herein, which may be installed in a host device, such as, for example, any one of the UEs 120-122 and/or AP no in FIG. 1. As shown, the processing system 1700 includes a processor 1704, a memory 1706, and interfaces 1710-1714, which may (or may not) be arranged as shown in FIG. 17. The processor 1704 may be any component or collection of components adapted to perform computations and/or other processing related tasks, and the memory 1706 may be any component or collection of components adapted to store programming and/or instructions for execution by the processor 1704. In an embodiment, the memory 1706 includes a non-transitory computer readable medium. The interfaces 1710, 1712, 1714 may be any component or collection of components that allow the processing system 1700 to communicate with other devices/components and/or a user. For example, one or more of the interfaces 1710, 1712, 1714 may be adapted to communicate data, control, or management messages from the processor 1704 to applications installed on the host device and/or a remote device. As another example, one or more of the interfaces 1710, 1712, 1714 may be adapted to allow a user or user device (e.g., personal computer (PC), etc.) to interact/communicate with the processing system 1700. The processing system 1700 may include additional components not depicted in FIG. 17, such as long term storage (e.g., non-volatile memory, etc.).

In some embodiments, the processing system 1700 is included in a network device that is accessing, or part otherwise of, a telecommunications network. In one example, the processing system 1700 is in a network-side device in a wireless or wireline telecommunications network, such as a base station, a relay station, a scheduler, a controller, a gateway, a router, an applications server, or any other device in the telecommunications network. In other embodiments, the processing system 1700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1710, 1712, 1714 connects the processing system 1700 to a transceiver adapted to transmit and receive signaling over the telecommunications network.

Figure 18:
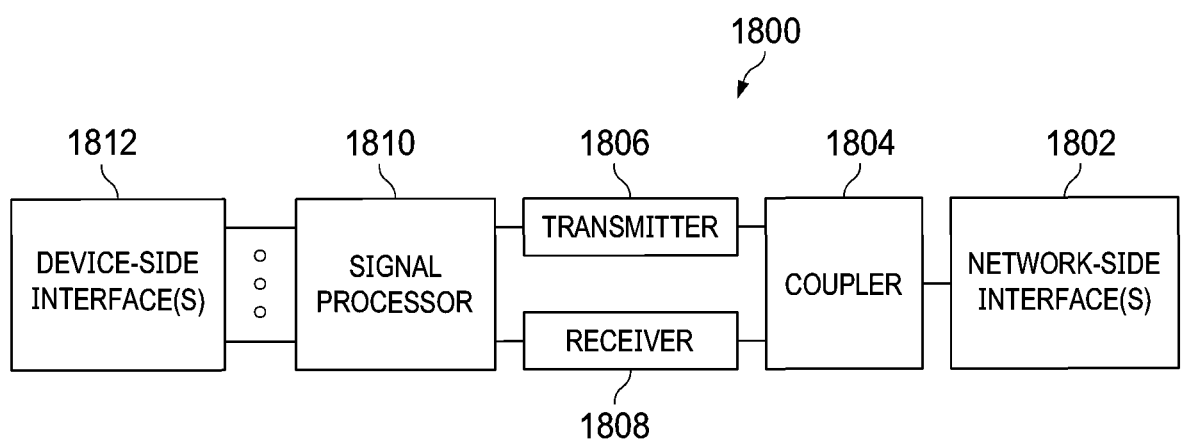
FIG. 18 illustrates a block diagram of a transceiver adapted to transmit and receive signaling over a telecommunications network.

FIG. 18 illustrates a block diagram of a transceiver 1800 adapted to transmit and receive signaling over a telecommunications network. The transceiver 1800 may be installed in a host device, such as, for example, any one of the UEs 120-122 and/or AP no in FIG. 1. As shown, the transceiver 1800 includes a network-side interface 1802, a coupler 1804, a transmitter 1806, a receiver 1808, a signal processor 1810, and a device-side interface 1812. The network-side interface 1802 may include any component or collection of components adapted to transmit or receive signaling over a wireless or wireline telecommunications network. The coupler 1804 may include any component or collection of components adapted to facilitate bi-directional communication over the network-side interface 1802. The transmitter 1806 may include any component or collection of components (e.g., up-converter, power amplifier, etc.) adapted to convert a baseband signal into a modulated carrier signal suitable for transmission over the network-side interface 1802. The receiver 1808 may include any component or collection of components (e.g., down-converter, low noise amplifier, etc.) adapted to convert a carrier signal received over the network-side interface 1802 into a baseband signal. The signal processor 1810 may include any component or collection of components adapted to convert a baseband signal into a data signal suitable for communication over the device-side interface(s) 1812, or vice-versa. The device-side interface(s) 1812 may include any component or collection of components adapted to communicate data-signals between the signal processor 1810 and components within the host device (e.g., the processing system 1700, local area network (LAN) ports, etc.).

The transceiver 1800 may transmit and receive signaling over any type of communications medium. In some embodiments, the transceiver 1800 transmits and receives signaling over a wireless medium. For example, the transceiver 1800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1802 includes one or more antenna/radiating elements. For example, the network-side interface 1802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In accordance with an embodiment of the present disclosure, a method in a wireless device for determining if a channel is clear in an unlicensed band channel in a wireless network is provided. The method includes detecting, with the wireless device, an energy along a first beamforming direction. The method also includes determining, with the wireless device, an energy detection threshold according to at least one of one or more transmit powers of the wireless device or one or more antenna gains of the transmission of the wireless device. The method also includes determining, with the wireless device, whether the unlicensed band channel is clear in at least the first receiving direction according to the energy and the energy detection threshold.

In accordance with another embodiment of the present disclosure, a wireless device configured to determine if a channel is clear in an unlicensed band channel in a wireless network is provided. The wireless device includes one or more antennas, a detector, a threshold determiner, and a channel state determiner. The detector is coupled to the one or more antennas. The detector is operable to detect an energy along a first beamforming direction. The threshold determiner is operable to determine an energy detection threshold according to at least one of one or more transmit powers of the wireless device or one or more transmit antenna gains of the wireless device. The channel state determiner is operable to determine whether the unlicensed band channel is clear in at least the first receiving direction according to the energy and the energy detection threshold.

In accordance with another embodiment of the present disclosure, a wireless device for determining if a channel is clear in an unlicensed band channel in a wireless network is provided. The wireless device includes a non-transitory memory storage comprising instructions and one or more processors in communication with the non-transitory memory storage. The one or more processors execute the instructions. The instructions include detecting an energy along a first beamforming direction. The instructions also include determining an energy detection threshold according to at least one of a transmit power(s) of the wireless device or antenna gain(s) of the transmission of the wireless device. The instructions also include determining whether the unlicensed band channel is clear in at least the first receiving direction according to the energy and the energy detection threshold.

In one or more of the preceding embodiments, the energy detection threshold is determined according to at least one a transmit power of the wireless device or a transmit antenna gain of the wireless device.

In one or more of the preceding embodiments, the antenna gain includes an element gain and an array gain.

In one or more of the preceding embodiments, the energy detection threshold is determined according to a maximum of antenna gains of a transmission following a first time interval.

In one or more of the preceding embodiments, the first time interval includes at least one listen before talk (LBT) time interval or at least one clear channel assessment (CCA) time interval.

In one or more of the preceding embodiments, the energy detection threshold is determined according to a maximum antenna gain of the wireless device.

In one or more of the preceding embodiments, the detecting the energy includes detecting energies over a plurality of receiving directions.

In one or more of the preceding embodiments, the energy is normalized according to the antenna gain of one or more receiving antennas.

In one or more of the preceding embodiments, detecting the energy includes beam sweeping over one or more time slots to detect a plurality of energies corresponding to a plurality of receiving directions, wherein each of the one or more time slots corresponds to a different receiving direction.

In one or more of the preceding embodiments, detecting the energy includes detecting a plurality of energies over a plurality of beamforming directions, wherein detection of energies in different receiving directions are interlaced in a frequency domain.

In one or more of the preceding embodiments, detecting the energy includes detecting a plurality of energies corresponding to a plurality of receiving directions in parallel.

In accordance with another embodiment, a method in a wireless device for determining if a channel is clear in an unlicensed band channel in a wireless network includes detecting, with the wireless device, an energy along a first receiving direction. The method also includes determining, with the wireless device, an energy detection threshold according to an effective EIRP. The effective EIRP is determined according to at least one of a mean equivalent isotropically radiated power (EIRP) and a maximum EIRP. The method also includes determining, with the wireless device, whether the unlicensed band channel is clear in at least the first receiving direction according to a comparison of the energy detected along the first receiving direction with the energy detection threshold. The EIRP is the product of at least one of a transmit power of the wireless device, one or multiple antenna gains of one or multiple beamforming vectors in a linear domain.

In one or more of the preceding embodiments, an effective antenna gain is determined according to a mean antenna gain and/or a maximum antenna gain.

In one or more of the preceding embodiments, the energy detection threshold is determined according to a mean or a maximum of antenna gains or a mean or a maximum of EIRPs of a transmission following a first time interval.

In one or more of the preceding embodiments, the first time interval is one of a listen before talk (LBT) or a clear channel assessment (CCA) time interval.

In one or more of the preceding embodiments, the energy detection threshold is determined according to a maximum antenna gain of the wireless device.

In one or more of the preceding embodiments, the detecting the energy comprises detecting energies over a plurality of receiving directions.

In one or more of the preceding embodiments, the energy is normalized according to the antenna gain of one or more receiving antennas.

In one or more of the preceding embodiments, the detecting the energy includes beam sweeping over one or more time slots to detect a plurality of energies corresponding to a plurality of receiving directions, wherein each of the one or more time slots corresponds to a different receiving direction.

In one or more of the preceding embodiments, the detecting the energy includes detecting a plurality of energies over a plurality of beamforming directions, wherein detection of energies in different receiving directions are interlaced in a frequency domain.

In one or more of the preceding embodiments, wherein the detecting the energy comprises detecting a plurality of energies corresponding to a plurality of receiving directions in parallel.

In one or more of the preceding embodiments, the method includes determining at least one of a mean EIRP and a max EIRP.

In one or more of the preceding embodiments, the mean EIRP comprises a weighted average of multiple EIRPs corresponding to each resource allocation in a following burst, wherein a weighting factor of each EIRP is related to a portion of resources in the burst in at least one of a time domain, a frequency domain, and a spatial domain.

In one or more of the preceding embodiments, the mean EIRP of a device is an average of a plurality of allowed EIRPs of an initiating device.

In one or more of the preceding embodiments, the maximum EIRP comprises a maximum of multiple EIRPs of each resource allocation in a following burst. When there are multiple resource allocation multiplexed in frequency domain at same time unit, the EIRP of the resource allocation multiplexed in frequency domain at the same time unit should be summed in linear domain. Then, the maximum is carried out among the multiple EIRP corresponding to each time unit.

In one or more of the preceding embodiments, the maximum EIRP of a device is a maximum of all allowed EIRPs of the initiating device.

In one or more of the preceding embodiments, the mean EIRP is determined according to:

$$\text{mean}(EIRP) = 10\log\left(\Sigma_i \frac{k_i n_i}{N} \Sigma_s \hat{P}_{s,i} \hat{G}_{s,i}\right),$$

where $k_i$ is the size of the time resource and $n_i$ is the size of the frequency resource assigned in the allocation i in terms of resource unit, N is the duration of the transmission time before carrying on additional Listen-Before-Talk (LBT) within a channel occupancy time (COT), $\hat{P}_{s,i}$ is a transmit power on a per time or frequency unit of spatial layer s in a linear domain, and $\hat{G}_{s,i}$ is the antenna gain of the beamforming vector of the spatial layer s of the allocation i in the linear domain.

In one or more of the preceding embodiments, the mean EIRP is a mean EIRP of a burst and is determined according to:

$$\text{mean}_{burst}(EIRP) = 10\log\left(\Sigma_i \frac{k_i n_i}{N} \Sigma_s \hat{P}_{s,i} \hat{G}_{s,i}\right),$$

where $k_i$ is the size of the time resource and $n_i$ is the size of the frequency resource assigned in the allocation i in terms of resource unit, N is the duration of the transmission time before carrying on additional Listen-Before-Talk (LBT) within a channel occupancy time (COT), $\hat{P}_{s,i}$ is a transmit power on a per time or frequency unit of spatial layer s in a linear domain, and $\hat{G}_{s,i}$ is the antenna gain of the beamforming vector of the spatial layer s of the allocation i in the linear domain.

In one or more of the preceding embodiments, the mean EIRP is a mean EIRP of an initiating device and the mean EIRP of the initiating device is determined according to:

$$\text{mean}_{device}(EIRP) = \text{mean}_{i,j}(10 \log(P_i \hat{G}_j)),$$

where $P_{max}$ is the maximum allowed transmit power of the initiating device in a linear domain, and $\hat{G}_j$ is the antenna gain of usable beamforming vector of the device in the linear domain.

In one or more of the preceding embodiments, the maximum EIRP is a maximum EIRP of a transmission burst, wherein the maximum EIRP of a transmission burst is determined according to:

$$\text{max}_{burst}(EIRP) = \text{max}_{k=0,\ldots,K-1}(10 \log(\Sigma_i n_{i,k} \Sigma_{s,k} \hat{P}_{s,i,k} \hat{G}_{s,i,k})),$$

where $k_i$ is the size of the time resource and $n_i$ is the size of the frequency resource assigned in the allocation i in terms of resource unit, N is the duration of the transmission burst before carrying on additional Listen-Before-Talk (LBT) within a channel occupancy time (COT), $\hat{P}_{s,i}$ is a transmit power on a per time or frequency unit of spatial layer s in a linear domain, and $\hat{G}_{s,i}$ is the antenna gain of the beamforming vector of the spatial layer s of the allocation i in the linear domain.

In one or more of the preceding embodiments, the maximum EIRP is a maximum EIRP of a device, wherein the maximum EIRP of the device is determined according to:

$$\text{max}_{device}(EIRP) = \text{max}_{j=0,\ldots,J-1}(10 \log(P_{max} \hat{G}_j)),$$

where $P_{max}$ is the maximum allowed transmit power of the initiating device in a linear domain, and $\hat{G}_j$ is the antenna gain of usable beamforming vector of the device in the linear domain.

In one or more of the preceding embodiments, the method includes initiating a burst following a successful Listen-Before-Talk (LBT), wherein the energy detection threshold is set according to a mean EIRP of the burst.

In one or more of the preceding embodiments, a wireless device extends a current continuous transmission burst without additional LBT when the mean or maximum EIRP including an allocation in the extension does not exceed the mean EIRP or the maximum EIRP when the transmitter is used to contend for the channel.

In one or more of the preceding embodiments, a wireless device performs another LBT before continuing transmitting an extension part when the effective EIRP including the allocation in the extension exceeds the effective EIRP when the transmitter is used to contend for the channel.

In one or more of the preceding embodiments, a wireless device performs another LBT before continuing transmitting an extension part when the mean EIRP or the maximum EIRP including the allocation in the extension exceeds the mean or maximum EIRP when the transmitter is used to contend for the channel.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by detecting unit/module and a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method in a wireless device for determining if a channel is clear in an unlicensed band channel in a wireless network, comprising:
   determining, by the wireless device, an energy detection threshold according to a maximum equivalent isotropically radiated power (EIRP) among EIRPs of one or more transmissions following a first time interval including at least one clear channel assessment (CCA) time interval, wherein an EIRP of the EIRPs is equal to a sum of antenna gain and transmit power of one of the one or more transmissions;
   detecting, by the wireless device, energy along a first beamforming direction by detecting a plurality of energies each corresponding to one of a plurality of receiving directions in parallel, wherein the first beamforming direction includes the plurality of receiving directions; and
   determining, by the wireless device, whether the unlicensed band channel is clear in at least the first beamforming direction according to the energy detected along the first beamforming direction and the energy detection threshold.

2. The method of claim 1, wherein the antenna gain of the wireless device comprises an element gain and an array gain.

3. The method of claim 1, wherein the first time interval further comprises at least one listen before talk (LBT) time interval.

4. The method of claim 1, wherein the energy along the first beamforming direction is normalized according to antenna gain of one or more receiving antennas.

5. The method of claim 1, the method further comprising:
   determining, by the wireless device, a CCA result at each of the plurality of receiving directions, wherein the unlicensed band channel determined being clear corresponds to one or more transmission directions, and wherein each CCA result at one or more receiving directions along the one or more transmission directions is clear.

6. A wireless device, comprising:
   at least one processor; and
   a non-transitory computer readable storage medium storing programming, the programming including instructions that, when executed by the at least one processor, cause the wireless device to perform operations including:
   determining an energy detection threshold according to a maximum equivalent isotropically radiated power (EIRP) among EIRPs of one or more transmissions following a first time interval including at least one clear channel assessment (CCA) time interval, wherein an EIRP of the EIRPs is equal to a sum of antenna gain and transmit power of one of the one or more transmissions;
   detecting energy along a first beamforming direction by detecting a plurality of energies each corresponding to one of a plurality of receiving directions in parallel, wherein the first beamforming direction includes the plurality of receiving directions; and
   determining whether an unlicensed band channel is clear in at least the first beamforming direction according to the energy detected along the first beamforming direction and the energy detection threshold.

7. The wireless device of claim 6, wherein the antenna gain of the wireless device comprises an element gain and an array gain.

8. The wireless device of claim 6, wherein the first time interval further comprises at least one listen before talk (LBT) time interval.

9. The wireless device of claim 6, wherein the energy along the first beamforming direction is normalized according to antenna gain of one or more receiving antennas.

10. The wireless device of claim 6, the operations further comprising:
    determining, by the wireless device, a CCA result at each of the plurality of receiving directions, wherein the unlicensed band channel determined being clear corresponds to one or more transmission directions, and wherein each CCA result at one or more receiving directions along the one or more transmission directions is clear.

11. A non-transitory computer-readable medium having instructions stored thereon that, when executed by a wireless device, cause the wireless device to perform operations, the operations comprising:
    determining an energy detection threshold according to a maximum equivalent isotropically radiated power (EIRP) among EIRPs of one or more transmissions following a first time interval including at least one clear channel assessment (CCA) time interval, wherein an EIRP of the EIRPs is equal to a sum of antenna gain and transmit power of one of the one or more transmissions;
    detecting energy along a first beamforming direction by detecting a plurality of energies each corresponding to one of a plurality of receiving directions in parallel, wherein the first beamforming direction includes the plurality of receiving directions; and
    determining whether an unlicensed band channel is clear in at least the first beamforming direction according to the energy detected along the first beamforming direction and the energy detection threshold.

12. The non-transitory computer-readable medium of claim 11, wherein the antenna gain of the wireless device comprises an element gain and an array gain.

13. The non-transitory computer-readable medium of claim 11, wherein the first time interval further comprises at least one listen before talk (LBT) time interval.

14. The non-transitory computer-readable medium of claim 11, wherein the energy along the first beamforming direction is normalized according to antenna gain of one or more receiving antennas.

15. The non-transitory computer-readable medium of claim 11, the operations further comprising:
    determining, by the wireless device, a CCA result at each of the plurality of receiving directions, wherein the unlicensed band channel determined being clear corresponds to one or more transmission directions, and wherein each CCA result at one or more receiving directions along the one or more transmission directions is clear.

* * * * *

UNITED STATES PATENT AND TRADEMARK OFFICE
CERTIFICATE OF CORRECTION

| | | |
|---|---|---|
| PATENT NO. | : 11,991,748 B2 | Page 1 of 1 |
| APPLICATION NO. | : 17/565100 | |
| DATED | : May 21, 2024 | |
| INVENTOR(S) | : Zhang et al. | |

It is certified that error appears in the above-identified patent and that said Letters Patent is hereby corrected as shown below:

In the Specification

In Column 14, Line 25, delete "$n_5$)," and insert -- n5), --.

In Column 15, Line 46, delete "no" and insert -- 110 --.

In Column 16, Line 25, delete "no" and insert -- 110 --.

Signed and Sealed this
Fourth Day of February, 2025

Coke Morgan Stewart
*Acting Director of the United States Patent and Trademark Office*